(12) United States Patent
Mesic, Jr.

(10) Patent No.: US 10,235,826 B2
(45) Date of Patent: Mar. 19, 2019

(54) VEHICLE DISPENSING SYSTEM

(71) Applicant: GM GLOBAL TECHNOLOGY OPERATIONS LLC, Detroit, MI (US)

(72) Inventor: Ronald J. Mesic, Jr., Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/673,780

(22) Filed: Aug. 10, 2017

(65) Prior Publication Data

US 2019/0051085 A1   Feb. 14, 2019

(51) Int. Cl.
*G06Q 10/08* (2012.01)
*G07F 11/00* (2006.01)
*G06Q 20/18* (2012.01)

(52) U.S. Cl.
CPC ....... *G07F 11/005* (2013.01); *G06Q 10/0875* (2013.01); *G06Q 20/18* (2013.01)

(58) Field of Classification Search
CPC .................................................... G07F 11/005
USPC ........................................................ 700/236
See application file for complete search history.

(56) References Cited

U.S. PATENT DOCUMENTS

| 2004/0160304 | A1* | 8/2004 | Mosgrove | B60R 25/23 340/5.21 |
| 2004/0249502 | A1* | 12/2004 | Truong | B60P 3/0257 700/232 |
| 2011/0071669 | A1* | 3/2011 | Garber | G07F 9/105 700/232 |
| 2013/0274917 | A1* | 10/2013 | Shimmerlik | G06Q 30/06 700/236 |
| 2014/0180474 | A1* | 6/2014 | Soares | G07F 11/002 700/236 |

* cited by examiner

*Primary Examiner* — Timothy R Waggoner

(57) ABSTRACT

In an example, a vehicle dispensing system to dispense a product in a vehicle is disclosed. The vehicle dispensing system includes a base connected to the vehicle and a dispensing apparatus connected to the base and configured to retain and dispense the product. The vehicle dispensing system includes a control module configured to determine a presence of the product retained by the dispensing apparatus or an absence of the product based upon a signal received from a sensor. The control module is also configured to track the presence of the product or the absence of the product. The control module is also configured to transmit a notification indicating the absence of the product.

20 Claims, 6 Drawing Sheets

VEHICLE DISPENSING SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a vehicle dispensing system, and more particularly to a vehicle dispensing system that includes a control module to determine a presence and/or an absence of a product retained within a dispensing apparatus.

People are increasingly using ride-sharing transport services for transportation needs. For example, ride-sharing transport services allow vehicle drivers to provide transport for other potential passengers according to a transport pooling arrangement. Additionally, autonomous driving vehicles may provide additional transportation services to passengers.

SUMMARY

In an example, a vehicle dispensing system to dispense a product in a vehicle is disclosed. The vehicle dispensing system includes a base connected to the vehicle and a dispensing apparatus connected to the base and configured to retain and dispense the product. The vehicle dispensing system includes a control module configured to determine a presence of the product retained by the dispensing apparatus or an absence of the product based upon a signal received from a sensor. The control module is also configured to track the presence of the product or the absence of the product. The control module is also configured to transmit a notification indicating the absence of the product.

In other features, the control module is further configured to generate a notification upon determining that the absence of the product exceeds a predetermined threshold. In other features, the dispensing apparatus includes at least one retention portion that is configured to detachably connect to the base.

In other features, the vehicle dispensing system includes the sensor, and the at least one retention portion includes the sensor. In other features, the sensor includes at least one of a radio-frequency identification sensor, a magnetic sensor, an airflow sensor, a radar sensor, an ultrasonic sensor, or an optical sensor. In other features, the product includes a detection device detectable by the sensor. In other features, the base includes an aperture configured to receive the at least one retention portion. In other features, the vehicle dispensing system includes a locking device that selectively locks the at least one retention portion in the aperture until occurrence of a predetermined event. In other features, the control module is further configured to, in response to determining the predetermined event has occurred, transmit an unlock signal to the locking device. In other features, the locking device comprises an electromagnetic lock.

In other features, the control module is further configured to transmit the notification indicating the absence of the product to at least one of a display, a speaker, or a computing device. In other features, the notification is transmitted to a remote vehicle management system or a payment processing system. In other features, the control module is configured to determine whether payment has been received for the product. In other features, the base is integrated into the vehicle.

In one example, a method to dispense a product in a vehicle is disclosed. The method includes determining a presence of the product retained by a dispensing apparatus and an absence of the product based upon a signal received from a sensor. The dispensing apparatus is connected to a base and configured to retain and dispense the product, and the base is connected to the vehicle. The method also includes tracking the presence of the product and the absence of the product and transmitting a notification indicating the absence of the product.

In other features, the method also includes generating a notification upon determining that the absence of the product exceeds a predetermined threshold. In other features, the dispensing apparatus includes at least one retention portion that is configured to detachably connect to the base. In other features, the base includes an aperture configured to receive the at least one retention portion, and the base further includes a locking device that selectively locks the at least one retention portion in the aperture until occurrence of a predetermined event.

In other features, method also includes, in response to determining the predetermined event has occurred, transmitting an unlock signal to the locking device. In other features, the notification is transmitted to a remote vehicle management system or a payment processing system.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1A:
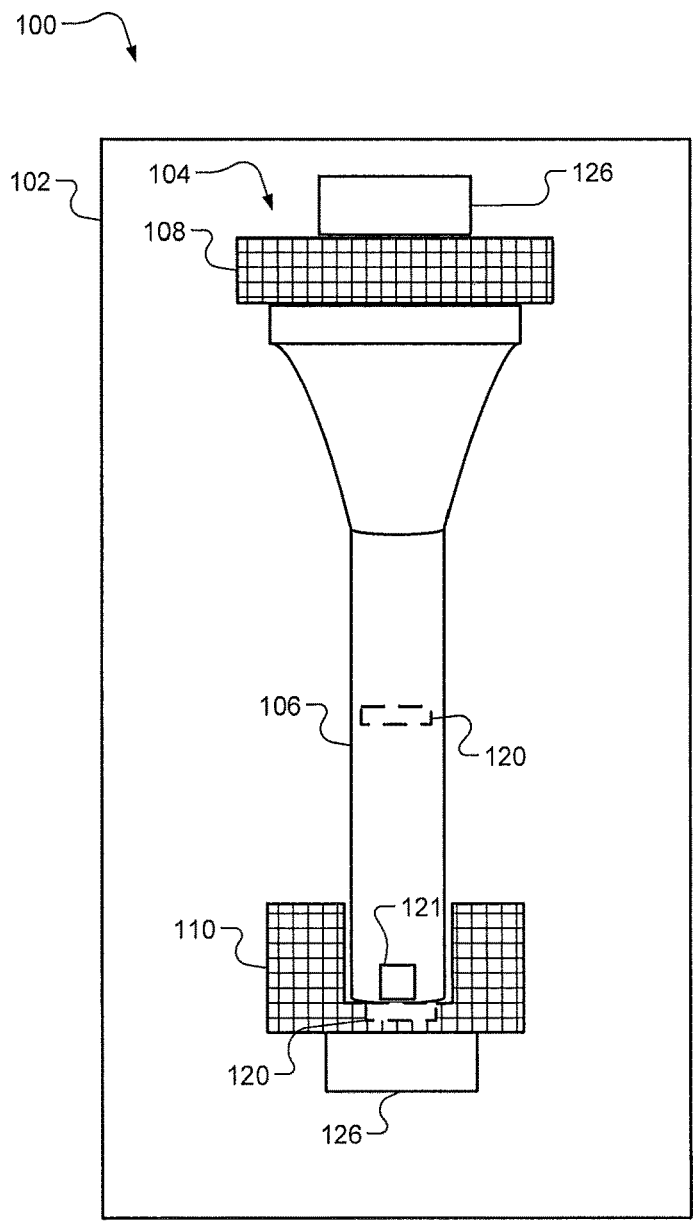
FIG. 1A is a plan view of a vehicle dispensing system in accordance with an example implementation of the present disclosure.

As ride-sharing transport services become more popular, passengers are less likely to have access to common vehicle personal products and/or vehicle products. For example, vehicles used within ride-sharing transport services and/or rental vehicles may have a limited selection of products that passengers and/or drivers use due to environmental conditions, upcoming business meetings, and/or vacation. These products may include safety equipment, such as snow brushes, scrapers, personal hygiene products, such as tooth brushes, combs, and the like.

The present disclosure is directed to a vehicle dispensing system that dispenses a product within a vehicle. The vehicle dispensing system can include a base connected to the vehicle and a dispensing apparatus connected to the base that retains and dispenses the product. The vehicle dispensing system also includes a control module that determines a presence of the product retained by the dispensing device or an absence of the product based upon a signal received from a sensor. The control module also tracks the presence of the product and the absence of the product and generates a notification upon determining that the absence of the product exceeds a predetermined threshold. The control module transmits the notification indicating the absence of the product.

FIGS. 1A through 1D illustrate a vehicle, dispensing system 100 in accordance with an example implementation of the present disclosure. The vehicle dispensing system 100 includes a base 102 and a dispensing apparatus 104 that connects to the base 102. The base 102 can be connected to a vehicle or integrated into the vehicle. The dispensing apparatus 104 retains a product 106 until the product 106 is removed by a user. The product 106 can include any suitable product that can be located within a vehicle. For example, the product 106 can include personal items, such as tissues, mints, lip balm, or the like, personal hygiene items and/or convenience items, such as deodorant, phone charger, nail clippers, beverages, food items, sewing kits, or the like, and/or safety-related items such as a window-scraper, a tire gauge, jumper cables, snow brushes, high-visibility gear, or the like. In some implementations, the base 102 defines a receptacle that can be used to store additional products 106.

Figure 1B:
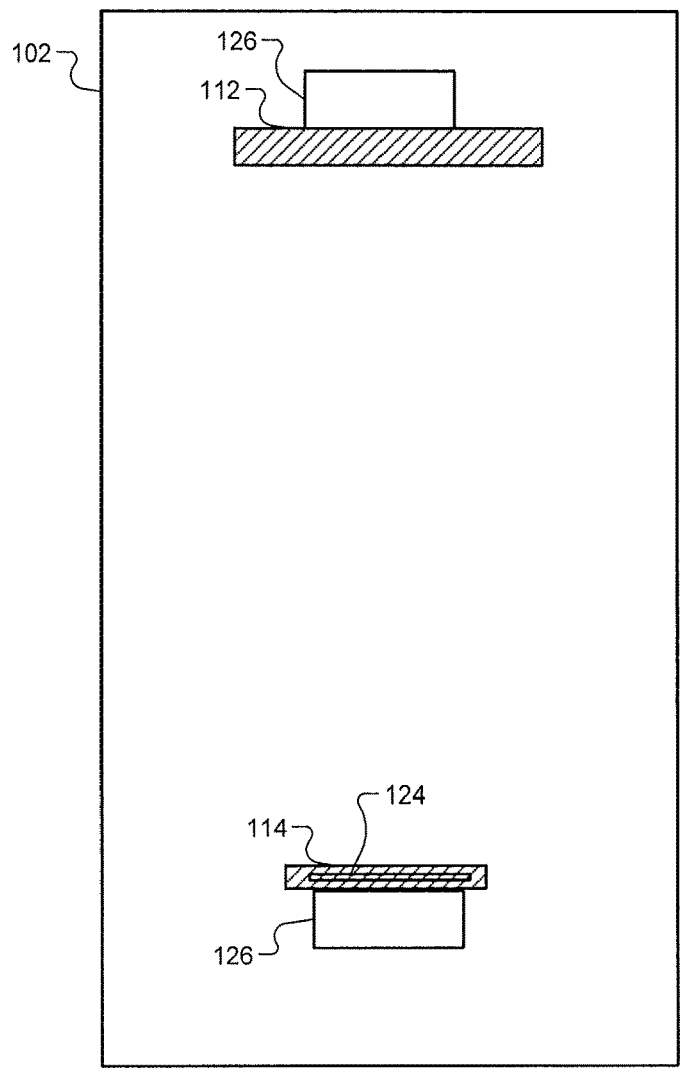
FIG. 1B is a plan view of a base of the vehicle dispensing system in accordance with an example implementation of the present disclosure.
Figure 1C:
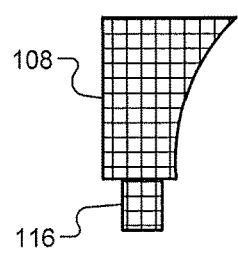
FIG. 1C is a side view of a first retention portion that is configured to be received by the base in accordance with an example implementation of the present disclosure.
Figure 1D:
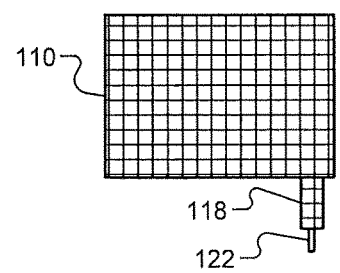
FIG. 1D is a side view of a second retention portion that is configured to be received by the base in accordance with an example implementation of the present disclosure.

In an implementation, the dispensing apparatus 104 includes a first retention portion 108 and a second retention portion 110 that detachably connect to the base 102. As shown in FIG. 1B, the base 102 defines apertures 112, 114. The aperture 112 can receive mating portion 116 (see FIG. 1C) of the first retention portion 108, and the aperture 114 can receive mating portion 118 (see FIG. 1D) of the second retention portion 110. The apertures 112, 114 maintain the first retention portion 108 and/or the second retention portion 110 to allow the product 106 to be retained until a user removes the product 106.

The vehicle dispensing system 100 includes a sensor 120 that generates a signal indicating a presence or an absence of the product 106. In various implementations, the second retention portion 110 includes the sensor 120. In these implementations, the sensor 120 can be positioned within the second retention portion 110 to minimize potential bypass. For example, the sensor 120 may be positioned within the second retention portion 110 so that the sensor 120 is proximate to a portion of the product 106 when the product 106 is retained by the dispensing apparatus 104. In one example, the second retention portion 110 is positioned so that the sensor 120 is adjacent to a portion of the product 106 when retained within the dispensing apparatus 104.

The vehicle dispensing system 100 may employ any suitable sensor 120 that can provide a signal indicative of the presence or the absence of the product 106. For example, the sensor 120 includes switches, radio-frequency identification (RFID) sensors, magnetic sensors, optical sensors, cameras, an airflow sensor, radar sensors, ultrasonic sensors, or the like. In various implementations, depending upon the configuration of the sensor 120, the product 106 may include a detection device 121 that allows the sensor 120 to track the product 106. The detection device 121 is a device detectable by the sensor 120 when the detection device 121 is proximate to the sensor 120. In one example, the product 106 may include an RFID tag that the sensor 120 tracks. In another example, the product may include a magnet that establishes a magnetic field with the sensor 120, and the presence of the magnetic field is tracked. However, it is understood that other configurations are possible.

In some instances, the sensor 120 comprises an airflow sensor that detects the presence or absence of airflow and provides a signal indicative of such. For example, the base 102 and/or the retention portions 108, 110 define an aperture that receives air when not covered by the product 106 (i.e., the product 106 is removed) and substantially does not receive air when covered by the product 106. Thus, the detection of substantially no airflow, or a restricted airflow, can indicate the presence of the product 106 and the detection of airflow can indicate the absence of the product 106.

In some implementations, the base 102 connects with a power and/or data system of a vehicle. The base 102 can be connected to other vehicle systems by way of a controller area network (CAN) bus. The power and/or data system can provide power to the vehicle dispensing system 100. For instance, the power system can power the sensor 120, and the data system receives data from the sensor 120. In an implementation, the second retention portion 110 includes a connector 122 that connects to a connector 124 included within the base 102.

The base 102 and the retention portions 108, 110 may be configured in a variety of ways. For example, the base 102 and/or the retention portions 108, 110 include a pliable material, such as plastic, rubber, or the like that can be formed through a suitable molding process. Thus, the base 102 and/or the retention portions 108, 110 can be replaceable and/or customizable to the product 106 to be retained and dispensed. For example, a vehicle owner and/or operator may employ different types of retention portions 108, 110 that can be interchanged depending upon the product 106 to be retained by the base 102.

The base 102 can employ a locking device 126 that selectively locks the retention portions 108, 110. For example, the locking device 126 selectively locks the mating portions 116, 118 within the apertures 112, 114 until a predetermined event has occurred. The base 102 can include multiple locking devices 126 to correspond to each retention portion 108, 110. For example, the locking device 126 prevents the driver and/or the passenger from retrieving the product 106 until the predetermined event, such as entering payment, or the like. In implementations, the locking device 126 may be an electromagnetic lock. In one example, the electromagnetic lock generates an electromagnetic field to exert a holding force on a conductor within the respective mating portions 116, 118. When the electromagnetic field is not exerting a holding force on the conductors, the retaining portions 108, 110 can be removed from the apertures to release the product 106.

Figure 2:
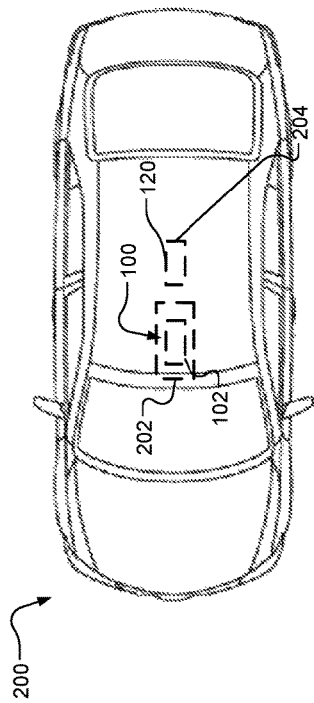
FIG. 2 is a plan view of a vehicle that includes the vehicle dispensing system in accordance with an example implementation of the present disclosure.

FIG. 2 illustrates a vehicle 200 that includes the vehicle dispensing system 100. In an implementation, the base 102 is connected to the vehicle 200. For instance, the vehicle 200 includes a base receiving portion 202 that receives the base 102. It is contemplated that multiple types of vehicles can employ the vehicle dispensing system 100 described herein. For example, the vehicle 200 may include a hybrid vehicle, a non-hybrid vehicle, an electric vehicle, a fuel cell vehicle, an autonomous vehicle, and other types of vehicles.

Figure 3:
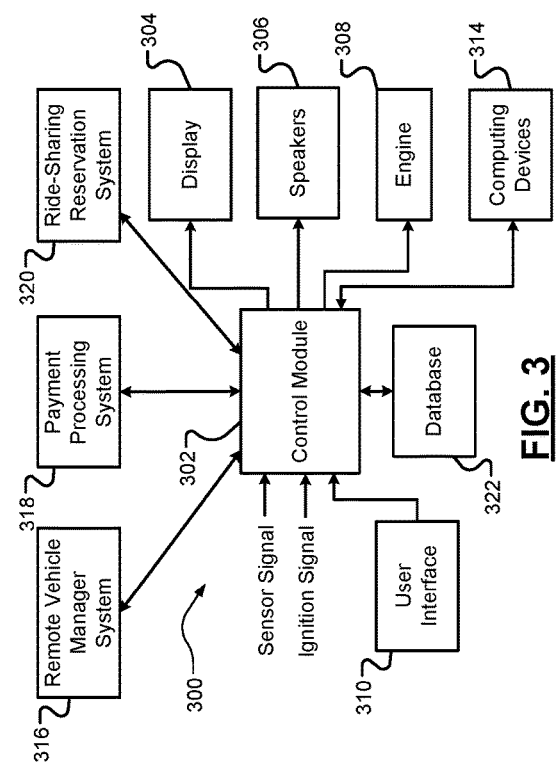
FIG. 3 is a block diagram illustrating vehicle systems configured to communicate and control the vehicle dispensing system in accordance with an example implementation of the present disclosure.

Referring to FIG. 3, the vehicle 200 includes vehicle systems 300 that control and/or operate various devices within the vehicle 200. The vehicle systems 300 include a control module 302, a display 304, speakers 306, an engine 308, and a user interface 310. As described in greater detail herein, the control module 302 monitors the vehicle dispensing system 100 to determine presence and/or absence of the product 106 within the vehicle dispensing system 100. The control module 302 can also selectively output notification alerts to a driver and/or owner of the vehicle 200 indicating the product 106 is absent. For example, the control module 302 can selectively output an alert to the display 304, the speakers 306, and/or a computing device 314. The computing device 314 may be a computing device 314 associated with an owner of the vehicle 200 that is in communication with the control module 302. The computing device 314 communicates with the control module 302 via a communication network. For example, the communication network may be a cellular network, a wireless area network, a wired network, or the like. The computing device 314 may include smartphones, desktop devices, laptop devices, tablet devices, or the like.

The control module 302 can also be in communication with a remote vehicle management system 316, a payment processing system 318, and/or a ride-sharing reservation system 320 via the communication network. The remote vehicle management system 316 may include a third-party entity that can communicate with the vehicle 200, such as ONSTAR, a software application that can establish communication with the vehicle (i.e., control module 302), or the like.

In implementations, an operator and/or a passenger of the vehicle 200 can initiate communication, such as satellite communication, with the remote vehicle management system 316. For example, the operator and/or the passenger can initiate communication with the remote vehicle management system 316 via the user interface 310. In response, the vehicle management system 316 may provide vending policies and/or directions for using the product 106. For instance, the vehicle management system 316 can provide instructions regarding use of safety equipment, or the like.

The payment processing system 318 provides payment processing functionality for the vehicle dispensing system 100. For example, the payment processing system 318 enables the operator and/or the passenger to execute a payment transaction to purchase or rent the product 106. In some implementations, the operator and/or the passenger may initiate the payment transaction through the user interface 310. For instance, the operator and/or the passenger can provide payment information via the user interface 310. In other implementations, the payment transaction is initiated via the control module 302 upon determining the product 106 has been removed from the vehicle dispensing system 100. In other implementations, the payment transaction is initiated via the control module 302 upon determining that the product 106 has not been replaced.

The control module 302 receives input signals from the sensor 120. The input signals can indicative of whether the product 106 is present (i.e., retained within the dispensing apparatus 104) or absent (i.e., not retained within the dispensing apparatus 104). For example, the sensor 120 tracks the presence of the product 106 based upon detection of the detection device 121. Once the product 106 is removed from the dispensing apparatus 104, the sensor 120 no longer detects the presence of the detection device 121 and provides a signal indicative of the absence.

In another example, the sensor 120 includes a camera 204 (see FIG. 2). The control module 302 receives input signals indicative of frames captured by the camera 204. The control module 302 compares pixel characteristics of the captured frames with baseline pixel characteristics indicative of the presence of the product 106. For instance, the control module 302 determines the absence of the product 106 when the captured pixel characteristics exceed a predetermined threshold with respect to the baseline pixel characteristics. In another instance, the product 106 includes one or more visual identification markers, such as a two-dimensional (2-D) barcode, a three-dimensional (3-D) barcode, or the like. In this instance, the control module 302 determines whether the product 106 is present or absent based upon whether the control module 302 detects the visual identification markers within the captured image frames.

The control module 302 tracks the presence and/or the absence of the product 106. In an implementation, the control module 302 includes a data log to store data indicating the absence of the product 106 from the vehicle dispensing system 100. For example, the control module 302 tracks when the product 106 was retrieved from the vehicle dispensing system 100, how long the product 106 was absent from the vehicle dispensing system 100 before being returned, and/or whether the product 106 was returned to the vehicle dispensing system 100.

The control module 302 generates a notification once the control module 302 determined that the absence of the product 106 exceeds a predetermined threshold. The notification can provide information indicating the product 106 is absent, and the predetermined threshold may a defined time period. In various examples, the time period is an adjustable time period based upon the product 106 or according to a previously agreed to time period.

The control module 302 can transmit the notification to one or more parties associated with the vehicle 200. For example, the control module 302 transmits the notification to one or more computing devices 314 associated with the owner, the operator, and/or the passenger of the vehicle 200.

When the control module 302 determines that the product 106 is absent, the control module 302 determines whether a payment transaction should be initiated. For example, the control module 302 can initially access a database 322 to determine whether the product 106 can be retrieved without a payment transaction. For example, the owner and/or the operator of the vehicle 200 may have indicated that payment has been received or that payment is not required for the product 106.

If the control module 302 determines that a payment transaction is required, the control module 302 transmits a signal to the payment processing system 318 to initiate the payment processing system 318. In some examples, the control module 302 accesses payment information from the database 322. In other examples, the control module 302 requests the driver and/or passenger to input the payment information at the display 304. The driver and/or passenger can input the payment information via the user interface 310, which is then provided to the payment processing system 318.

The payment processing system 318 provides a signal indicating the payment transaction is finalized to the control module 302. In response, the control module 302 provides a signal to the locking device 126 causing the locking device 126 to transition from a locked state to an unlocked state. For example, the control module 302 can provide a signal to cause the locking device 126 to generate an electromagnetic field to exert a holding force on the conductors and/or cause the locking device 126 to cease generating the electromagnetic field.

When the product 106 is returned to the vehicle dispensing system 100, the control module 302 determines whether any portion of the payment is to be returned. For example, when the driver and/or passenger retrieves the product 106 under a rental transaction, the control module 302 can determine whether any portion of the payment is to be returned based upon the rental transaction. For example, a portion of the financial payment may be returned when the product 106 is returned prior to expiration of a rental time and/or when the product 106 is returned.

The control module 302 also provides notifications to the ride-sharing reservation system 320 to indicate the product(s) 106 within the vehicle 200 and/or availability of the product(s) 106 within the vehicle 200. For example, when a prospective rider is arranging transport services, the prospective rider may query whether the vehicle 200 contains a particular product 106. The ride-sharing reservation system 320 queries the control module 302 to determine the availability of the product 106, and the control module 302 can provide a notification indicating the availability of the requested product 106.

In some implementations, the control module 302 can prevent operation of the vehicle 200 until the product 106 is returned or payment for the product 106 has been returned (i.e., present within the vehicle dispensing apparatus 100). For instance, the control module 302 may receive an ignition signal from an ignition key, button, or switch. The control module 302 can prevent the engine 308 from starting in response to receiving the ignition signal until the product 106 is returned.

Figure 4:
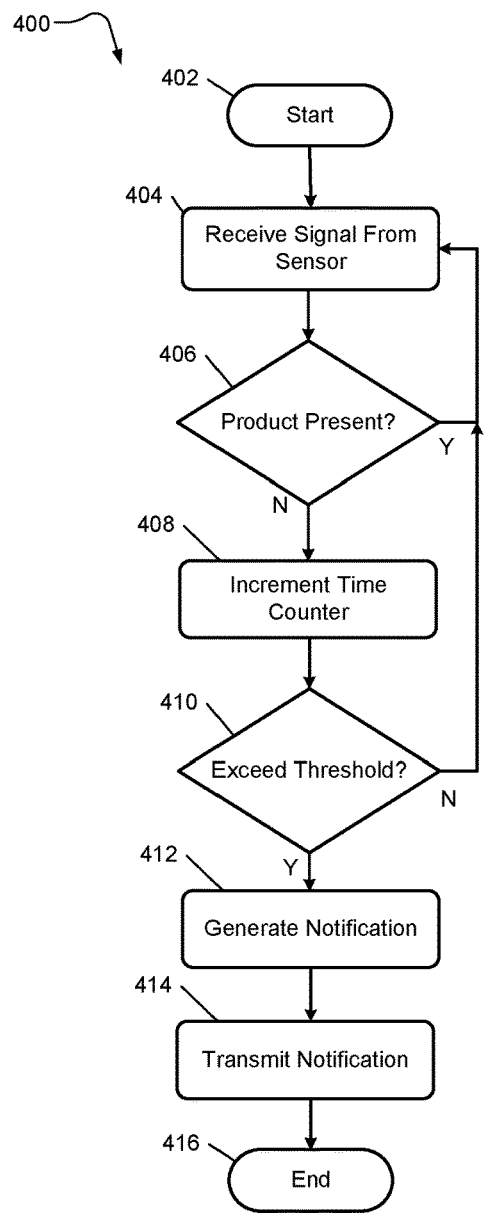
FIG. 4 is a flow diagram illustrating a method of controlling the vehicle dispensing system in accordance with an example implementation of the present disclosure.

FIG. 4 illustrates a method 400 in accordance with an example implementation of the present disclosure. At 402, the method 400 starts. At 404, a signal is received from the sensor 120. At 406, control determines whether the product 106 is present or absent from the dispensing apparatus 104. If the control determines the product 106 is present, the method 400 returns to 404. If control determines that the product 106 is absent, a time counter is incremented at 408. At 410, control determines whether the time counter exceeds a predetermined threshold. If control determines that the time counter does not exceed the predetermined threshold, the method returns to 404.

If the control determines that the time counter does exceed the predetermined threshold, control generates a notification indicating the product 106 has not been returned at 412. At 414, the notification is transmitted. At 416, the method 400 ends.

Figure 5:
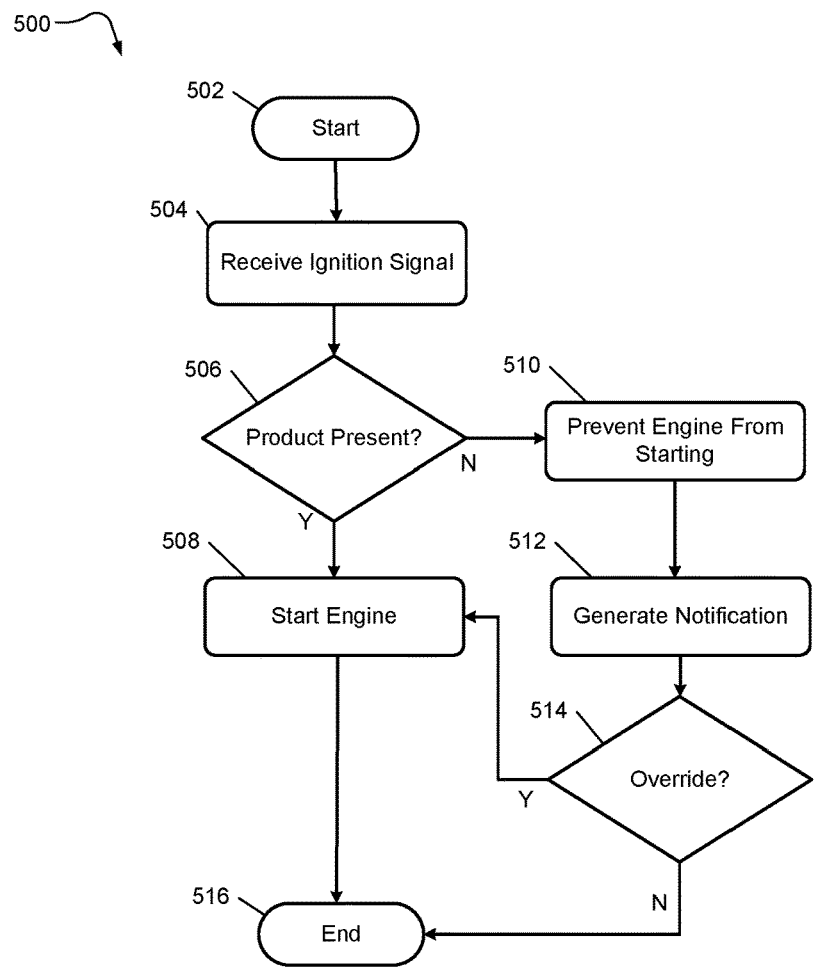
FIG. 5 is a flow diagram illustrating another method of controlling the vehicle dispensing system in accordance with an example implementation of the present disclosure.

FIG. 5 illustrates a method 500 in accordance with an example implementation of the present disclosure. At 502, the method 500 starts. At 504, an ignition signal is received. At 506, control determines whether the product 106 is in place or has been returned. If the product 106 has been returned, control starts the engine 308 at 508. If the product 106 has not been returned, control prevents the engine 308 from starting at 510.

At 512, a notification is generated to indicate that the product 106 has not been returned. The notification may be displayed at the display 308 and/or transmitted to a computing device 314 associated with the driver and/or passenger of the vehicle 200. At 514, control determines whether an override has been received. For example, an owner and/or operator of the vehicle 200 may provide an administrative override signal to the control module 302. In various implementations, an override signal may be provided to the control module 302 via the user interface 310, the remote vehicle manager system 318, and/or the computing devices 314. The method 500 ends at 516.

Figure 6:
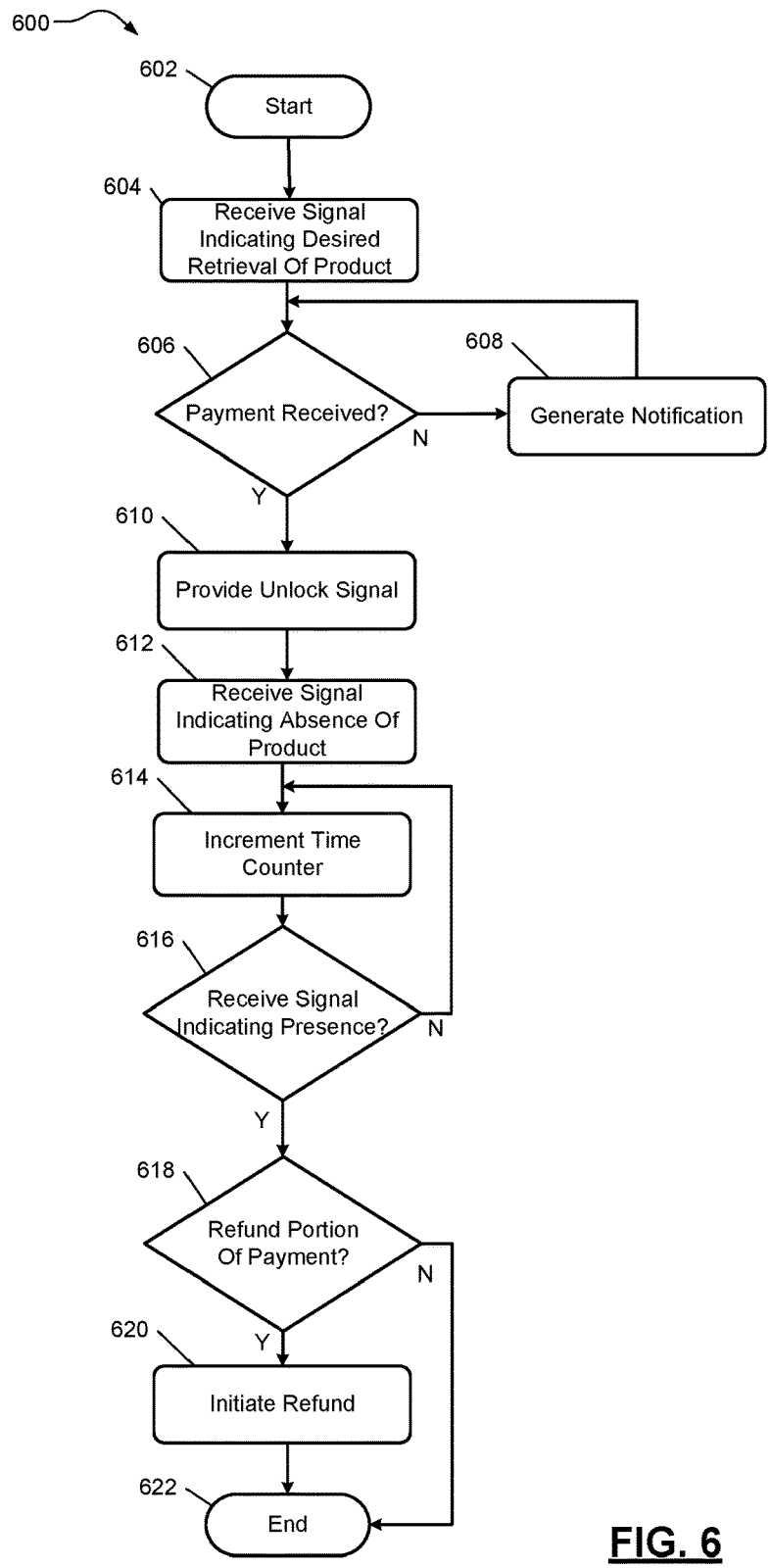
FIG. 6 is a flow diagram illustrating another method of controlling the vehicle dispensing system in accordance with an example implementation of the present disclosure.

FIG. 6 illustrates a method 600 in accordance with an example implementation of the present disclosure. At 602, the method 600 starts. At 604, a signal is received indicating that the driver and/or passenger wants to retrieve the product 106. At 606, control determines whether payment has been received for the product 106. For example, the control module 302 queries the payment processing system 318. If control determines payment has not been received, a notification is provided indicating payment has not been received at 608. The method 600 returns to 606. If control determines payment has been received, control provides an unlock signal to the locking device 126 at 610.

At 612, a signal is received from the sensor 120 indicating the absence of the product 106. At 614, a time counter is incremented. At 616, control determines whether a signal indicating the presence of the product 106 has been received. If no signal indicating the presence of the product 106 has been received, control increments the time counter. If the signal indicating the presence of the product 106 has been received, control determines whether a portion of the payment is to be refunded at 618. For example, the control module 302 queries the database 322 to determine whether a portion of the payment is to be refunded based upon the elapsed time. For example, the database 322 can maintain data indicative of the refund portion based upon the elapsed time. If a portion of the payment is to be refunded, control initiates a refund process at 620. For example, the control module 302 provides a signal to payment processing system 318 indicative of the refund amount. The method 600 ends at 622.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A vehicle dispensing system to dispense at least one product in a vehicle, comprising:
 a base connected to the vehicle;
 a dispensing apparatus connected to the base and configured to retain and dispense the at least one product;
 a control module configured to:
  determine at least one of a presence of the at least one product retained by the dispensing apparatus and an absence of the at least one product based upon a signal received from a sensor;

track the at least one of the presence of the at least one product and the absence of the at least one product;

prevent operation of the vehicle when the at least one product is absent; and transmit a notification indicating the absence of the at least one product.

2. The vehicle dispensing system as recited in claim 1, wherein the control module is further configured to generate a notification upon determining that the absence of the at least one product exceeds a predetermined threshold.

3. The vehicle dispensing system as recited in claim 1, wherein the dispensing apparatus comprises at least one retention portion that is configured to detachably connect to the base.

4. The vehicle dispensing system as recited in claim 3, further comprising the sensor, wherein the at least one retention portion includes the sensor.

5. The vehicle dispensing system as recited in claim 4, wherein the sensor comprises an airflow sensor configured to indicate the absence of the at least one product when the airflow sensor detects airflow.

6. The vehicle dispensing system as recited in claim 4, wherein the at least one product includes a detection device detectable by the sensor.

7. The vehicle dispensing system as recited in claim 3, wherein the base includes an aperture configured to receive the at least one retention portion.

8. The vehicle dispensing system as recited in claim 7, further comprising a locking device that selectively locks the at least one retention portion in the aperture until occurrence of a predetermined event.

9. The vehicle dispensing system as recited in claim 8, wherein the control module is further configured to, in response to determining the predetermined event has occurred, transmit an unlock signal to the locking device.

10. The vehicle dispensing system as recited in claim 8, wherein the locking device comprises an electromagnetic lock.

11. The vehicle dispensing system as recited in claim 1, wherein the control module is further configured to transmit the notification indicating the absence of the at least one product to at least one of a display, a speaker, and a computing device.

12. The vehicle dispensing system as recited in claim 1, wherein the notification is transmitted to at least one of a remote vehicle management system and a payment processing system.

13. The vehicle dispensing system as recited in claim 1, wherein the control module is configured to determine whether payment has been received for the at least one product.

14. The vehicle dispensing system as recited in claim 1, wherein the base is integrated into the vehicle.

15. A method to dispense at least one product in a vehicle, comprising:

determining at least one of a presence of the at least one product retained by a dispensing apparatus and an absence of the at least one product based upon a signal received from a sensor, wherein the dispensing apparatus is connected to a base and configured to retain and dispense the at least one product, the base connected to the vehicle;

tracking the at least one of the presence of the at least one product and the absence of the at least one product;

preventing operation of the vehicle when the at least one product is absent;

permitting operation of the vehicle when at least one of the signal indicates the presence of the at least one product and an override signal is received; and transmitting a notification indicating the absence of the at least one product.

16. The method as recited in claim 15, further comprising: generating a notification upon determining that the absence of the at least one product exceeds a predetermined threshold.

17. The method as recited in claim 15, wherein the dispensing apparatus comprises at least one retention portion that is configured to detachably connect to the base.

18. The method as recited in claim 17, wherein the base includes an aperture configured to receive the at least one retention portion, the base further comprising a locking device that selectively locks the at least one retention portion in the aperture until occurrence of a predetermined event.

19. The method as recited in claim 18, further comprising: in response to determining the predetermined event has occurred, transmitting an unlock signal to the locking device.

20. The method as recited in claim 15, wherein the notification is transmitted to at least one of a remote vehicle management system and a payment processing system.

\* \* \* \* \*